United States Patent Office 3,004,828
Patented Oct. 17, 1961

3,004,828
METHOD OF PREPARING CYANOGEN FROM HYDROGEN CYANIDE
William L. Fierce, Crystal Lake, and Walter J. Sandner, Carpentersville, Ill., assignors to The Pure Oil Company, Chicago, Ill., a corporation of Ohio
No Drawing. Filed Nov. 25, 1959, Ser. No. 855,276
9 Claims. (Cl. 23—151)

This invention relates to new and useful improvements in processes for the preparation of cyanogen, and more particularly to a process in which dry gaseous hydrogen cyanide is reacted with a solid dry cupric ($Cu^{++}$) compound, e.g., cupric chloride, cupric sulfate, or copper chromite, at a temperature of about 100°–400° C.

Cyanogen, $(CN)_2$, is a well-known compound which is useful as an intermediate in the preparation of a variety of organic compounds. Classical methods of producing cyanogen include (1) dehydration of ammonium oxalate, (2) thermal decomposition of mercuric cyanide, and (3) reaction of sodium cyanide and copper sulfate solutions, wherein part of the cyanogen is evolved as cyanogen gas and part remains as cuprous cyanide. Cyanogen is useful in the preparation of a variety of organic compounds, e.g., aliphatic nitriles, cyanic acid, and oxamide.

It is one object of this invention to provide a new and improved method for the preparation of cyanogen.

Another object of this invention is to provide a method for preparing cyanogen by anhydrous gas phase partial oxidation of hydrogen cyanide.

A feature of this invention is the provision of an improved process for the preparation of cyanogen by partial oxidation of hydrogen cyanide by reaction with a cupric compound, e.g., cupric chloride, cupric sulfate, or copper chromite, under anhydrous conditions at a temperature of about 100°–400° C.

Other objects and features of this invention will become apparent from time to time throughout the specification and claims as hereinafter related.

This invention is based upon our discovery that cyanogen is produced in good yields by the reaction of dry gaseous hydrogen cyanide with a solid dry cupric ($Cu^{++}$) compound selected from the group consisting of cupric chloride, cupric sulfate, and copper chromite, at a temperature of about 100–400° C.

The Jacquemin method for the preparation of cyanogen by the reaction of potassium cyanide (KCN) on aqueous cupric sulfate ($CuSO_4$) has been in use for preparing cyanogen. G. Hahn and W. Leopold described the method in considerable detail in Ber. 68, 1974 (1935). B. Ricca in Ann. Chim. Applicata 16, 83 (1926), also discusses this reaction, and the method is described in detail in Inorganic Syntheses. In this reaction, cyanogen is evolved spontaneously by the addition of a saturated aqueous KCN solution to a saturated aqueous $CuSO_4$ solution. The reaction is as follows:

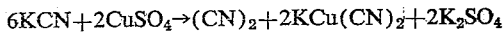

We have found after numerous trials that this method is not convenient as a general laboratory method for several reasons. Firstly, large volumes of liquids must be handled, including the toxic KCN solution. When the reaction is completed, the spent reaction solution is also toxic and must be disposed of. Secondly, during the addition of the aqueous KCN, there is a tendency for black, solid material to be formed. This is probably polymerized cyanogen, i.e., paracyanogen, which thus reduces the yields. In addition, this solid material can plug restricted areas in the apparatus and thus interfere with the process. Thirdly, the process cannot be conveniently operated in a continuous manner. After the KCN solution has been added, it is necessary to heat and strip the reaction solution in order to get the maximum cyanogen yield.

We have found that these difficulties can be avoided and good cyanogen yields obtained by our new and improved process. In our process, a solid cupric compound, selected from the group consisting of cupric chloride, cupric sulfate, and copper chromite, is heated to about 100°–400° C. and gaseous HCN is passed over or through a bed of the heated solid copper compound. Cyanogen is formed as a gas and can be recovered by conventional separatory techniques from the effluent gases from the reaction zone. As such a run continues with any given batch of solid cupric compound, the cyanogen yield gradually diminishes. This is apparently due to contamination of the surface of the cupric compound with reaction products during the course of the reaction and can be at least partially overcome by carrying out the process under conditions of attrition which insure maximum gas-solid contact. Thus, the reaction can be carried out in a ball mill which continually pulverizes and exposes fresh reaction surface on the cupric compound or by bubbling the HCN through a dispersion of the cupric compound in an inert non-aqueous liquid, such as mineral oil, wherein the cupric compound is maintained in suspension by a high-speed stirrer.

The following non-limiting examples are illustrative of the scope of this invention.

EXAMPLE I

A vertically-mounted, Vycor reaction tube was charged with 15 cc. of a commercial copper chromite catalyst (analyzing 80% CuO and 16–17% $Cr_2O_3$) which was heated electrically to about 150° C. A gaseous stream of HCN was charged to the reaction zone by bubbling helium through liquid HCN held at about 0° C. by an ice-water bath. Gas samples of the charge and product gases were taken at intervals and analyzed using the mass spectrometer. In Table I, there are set forth the results of this run at different time intervals under the conditions used in this reaction.

Table I

| Hours run | ½ | 2 | 4 | 6 |
|---|---|---|---|---|
| Composition of charge gas in cc./min.: | | | | |
| Helium | 176 | 180 | 180 | 180 |
| HCN | 46.8 | 63.4 | 63.4 | 63.4 |
| Temperature (° C.) | 170 | 160 | 158 | 160 |
| Gaseous hourly space velocity of charge gas | 892 | 976 | 976 | 976 |
| HCN conversion, percent | 99.0 | 33.8 | 16.6 | 19.4 |
| Cyanogen yield per pass [1] | 59.0 | 26.6 | 13.3 | 5.7 |
| Cyanogen selectivity [1] | 59.5 | 78.5 | 80.0 | 34.2 |

[1] The above yields were calculated based on the assumption that the reaction is similar to the Jacquemin reaction. Thus the reaction in an unbalanced form is as follows:

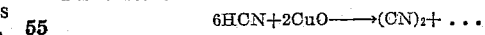

EXAMPLE II

In another experiment, using the apparatus of Example I, 15 cc. of 10% cupric oxide on pumice was substituted for the copper chromite. A gaseous stream of HCN was charged to the reaction zone by bubbling helium through liquid HCN held at about 0° C. by an ice-water bath. The cupric oxide was maintained at a temperature of 162°–208° C. while being contacted with 36/64 HCN/helium mixture at a space velocity of 500, for 4 hours. In this experiment no cyanogen was obtained. When chromia on alumina was substituted for the cupric oxide in other runs (at 215° and 464° C.), no cyanogen was obtained. These runs indicate that cupric oxide and chromia are ineffective when used separately, but react with HCN to produce cyanogen when present together in the form of the commercial copper chromite catalyst.

EXAMPLE III

In another experiment, using the apparatus of Example I, 15 cc. of a granular mixture of cupric and cuprous chlorides was substituted for the copper chromite. HCN and helium were charged at a GHSV of 511 at 103° C. There was a 23.7% consumption of HCN after ⅓ hour. In this experiment, cyanogen was obtained in a yield of about 2.5% per pass or selectivity of 64% based on HCN consumed.

EXAMPLE IV

In another experiment, using the apparatus of Example I, cupric sulfate ($CuSO_4 \cdot 5H_2O$) was substituted for the copper chromite. The charge gas was 33% HCN and 67% helium, and was fed at a GHSV of 300 for 20 minutes. At 102° C., there was a 8.2% consumption of HCN and production of cyanogen in a 0.31% yield per pass. At 227° C., the consumption of HCN was 20.3% and yield per pass of cyanogen was 0.57%.

EXAMPLE V

A horizontally-mounted, center-feed ball mill is charged with 25 cc. of commercial copper chromite (Harshaw Chemical Co., Catalyst Cu-0203T, ⅛" pellets) and 200 g. of ⅛" fused alumina balls. The apparatus is heated electrically to a temperature of about 150° C. and rotated to maintain the copper chromite in a state of continuous attrition by the balls. A gaseous stream of HCN is charged to the reaction zone (the ball mill) by bubbling helium through liquid HCN held at about 0° C. by an ice-water bath. The mixture of helium and HCN is fed through the center feed opening of the ball mill and withdrawn at the other end. Cyanogen is formed as a gas as a result of reaction between the gaseous HCN and the copper oxide and can be condensed from the reaction effluent using conventional separatory techniques. In this form of reaction apparatus, the HCN conversion remains high through several hours of operation. The initial yields from this apparatus are substantially the same as were obtained in Example I, and there is no substantial decline in HCN conversion or in cyanogen yields or selectivity per pass after 4 or 5 hours of operation. This sustained yield of cyanogen apparently results from the continuous attrition of the copper chromite by the alumina balls which continuously exposes a fresh reaction surface for reaction with the gaseous HCN. When copper chloride or copper sulfate is reacted with dry gaseous HCN in a ball mill, higher yields of cyanogen are obtained.

EXAMPLE VI

A 500-ml. three-necked flask is charged with 30 g. of powdered copper chromite catalyst dispersed in 250 ml. white oil. The flask is equipped with a high-speed stirrer and inlet and outlet tubes positioned in the necks of the flask and arranged for bubbling HCN through the mineral oil copper chromite dispersion. The flask and contents are heated to about 150° C. using an electric mantle. A gaseous stream of HCN is charged to the flask by bubbling helium through liquid HCN held at about 0° C. by an ice-water bath. Gas samples of the charge and product gases are taken off at intervals for mass spectrometric analysis. The mixture of helium and HCN is bubbled through the dispersion of copper chromite in mineral oil which is maintained in suspension by the high-speed stirrer. Using this apparatus, the initial HCN conversion is high and increased cyanogen yields are obtained. The HCN conversion and cyanogen yields remain at a high level even after several hours of operation. The action of the high-speed stirrer in maintaining the copper chromite in suspension is believed to result in the exposure of fresh reaction surfaces to permit a continuous reaction with the HCN. In this embodiment of the invention, the liquid which is used for suspending the cupric compound may be any inert non-aqueous liquid in which the copper compound is insoluble. Any of the various cuprice compounds (e.g., copper chloride or copper sulfate) which react with HCN in the gas phase will likewise react with anhydrous gaseous HCN in suspension where, as in this example, the use of a high-speed stirrer maintains the cupric compound in suspension and continuously exposes fresh reaction surfaces.

In carrying out the process of this invention, the reactant cupric compound may be used in a solid granular or pulverized state to react with dry gaseous HCN. The reaction is carried out between the copper compound (which may be dispersed in an inert non-aqueous liquid) in the granular solid state at temperatures above 100° C. The reaction temperature may vary from about 100° C. to as high as about 400° C. However, the process is preferably carried out in a temperature range from about 100° to 300° C. At about 450° C., copper chromite effects the complete oxidation of HCN to $CO_2$, CO, $H_2O$, and $N_2$. The rate of flow of hydrogen cyanide through the reaction zone is not critical and may vary widely, as for example, from a space velocity as low as 0.1 to space velocities as high as 10,000. The hydrogen cyanide may be vaporized directly into the reactor or may be fed together with an inert diluent, such as helium, nitrogen, hydrogen, argon, etc. In carrying out this process, the reaction effluent may be passed through a suitable cold trap to condense unreacted HCN which may then be removed from the trap and recycled with fresh HCN and diluent gas, if needed, to the reaction zone. As was pointed out in connection with Examples V and VI, the yield and selectivity of cyanogen remain at a higher level when the reaction is carried out under conditions of attrition which result in the continuous exposure of fresh reaction surface for reaction between the cupric compound and the gaseous HCN.

While we have described our invention fully and completely as required by the patent statutes, including a full and complete description of what we now consider to be the best mode of carrying out our invention, we wish it to be understood that within the scope of the appended claims this invention may be practiced otherwise than as specifically described.

The embodiments of the invention in which an exclusive property or privilege is claimed are defined as follows:

1. A method of preparing cyanogen which comprises reacting dry gaseous hydrogen cyanide with a solid dry cupric compound selected from the group consisting of cupric chloride, cupric sulfate, and copper chromite, under anhydrous conditions, at a temperature of about 100°–400° C.

2. A method according to claim 1 in which the cupric compound is subjected to continuous attrition to continually expose fresh reaction surface.

3. A method according to claim 2 in which the reaction is carried out in a ball mill which continually subjects the cupric compound to attrition to expose fresh reaction surface.

4. A method according to claim 1 in which the cupric compound is dispersed in an inert non-aqueous liquid, the dispersion is subjected to the reaction of a high-speed stirrer to maintain the cupric compound continuously in suspension and to subject the cupric compound to attrition to expose fresh reaction surfaces, dry gaseous hydrogen cyanide is bubbled through the dispersion, and cyanogen is recovered from the reaction effluent.

5. A method according to claim 1 in which a mixture of hydrogen cyanide and an inert diluent gas is contacted with the heated cupric compound.

6. A method according to claim 1 in which the hydrogen cyanide is passed in contact with the cupric compound at a space velocity of about 0.1 to 10,000.

7. A method according to claim 1 in which cupric compound is copper chromite and the reaction temperature is in the range from about 100° to 300° C.

8. A method according to claim 1 in which the cupric compound is cupric sulfate and the reaction temperature is in the range from about 100° to 300° C.

9. A method according to claim 1 in which the cupric compound is cupric chloride and the reaction temperature is in the range from about 100° to 300° C.

References Cited in the file of this patent
UNITED STATES PATENTS 2,841,472    Fierce et al. _____ July 1, 1958